July 8, 1924.
D. A. RITCHIE
1,500,640
AUTOMOBILE HEADLIGHT ATTACHMENT
Filed May 24, 1923
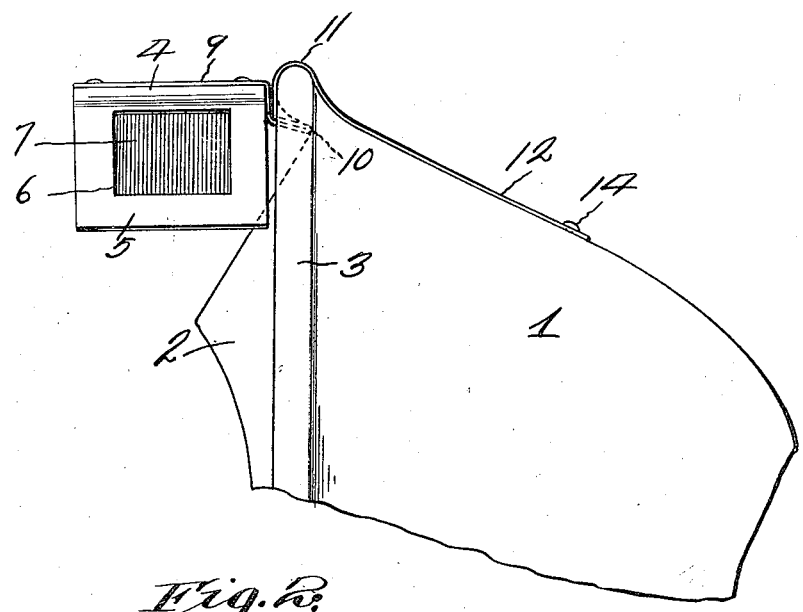
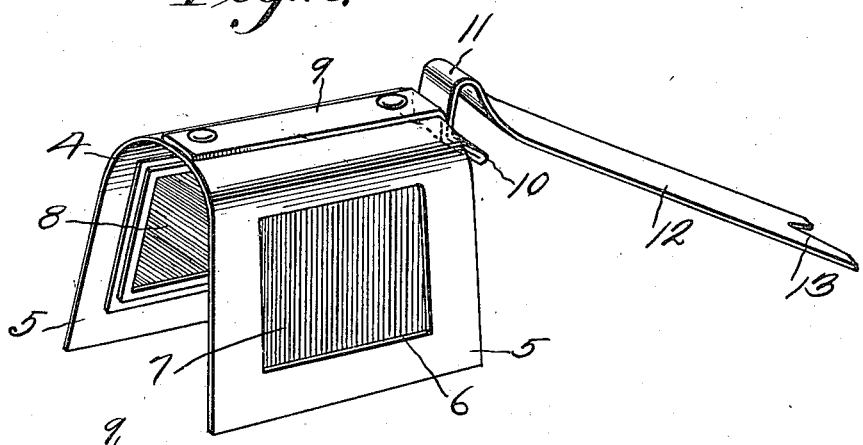
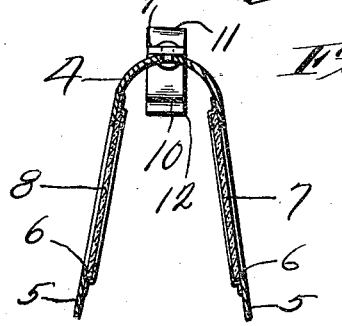
Inventor
D. A. Ritchie
By D. Swift
Attorney Patented July 8, 1924.

1,500,640

UNITED STATES PATENT OFFICE.

DAVID A. RITCHIE, OF CENTRALIA, ILLINOIS.

AUTOMOBILE HEADLIGHT ATTACHMENT.

Application filed May 24, 1923. Serial No. 641,145.

*To all whom it may concern:*

Be it known that I, DAVID A. RITCHIE, a citizen of the United States, residing at Centralia, in the county of Marion, State of Illinois, have invented a new and useful Automobile Headlight Attachment; and I do hereby declare the following to be a full, clear, and exact description of the invention, such as will enable others skilled in the art to which it appertains to make and use the same.

The invention relates to automobile headlight attachments, and has for its object to provide a U-shaped member detachably supported forwardly of the automobile light with its flanges downwardly disposed and provided with transparent colored glasses through which light rays will pass for signalling approaching vehicles from either side as to the direction of travel of the vehicle on which the device is located and allowing an approaching vehicle to ascertain which vehicle has the right of way.

A further object is to form the supporting arm for the device from a single piece of material bent to form an arm for engaging the upper side of the headlight casing and a member adapted to clamp over the rim of the headlight and adapted to clamp the device in position on the headlight.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a portion of a conventional form of headlight showing the device applied thereto.

Figure 2 is a perspective view of the signalling device.

Figure 3 is a transverse sectional view through the signalling device.

Referring to the drawing, the numeral 1 designates a conventional form of automobile headlight, 2 the lens thereof and 3 the rim of the headlight. It has been found that at night it is hard for vehicles when approaching at angles to each other, for the operators of said vehicles to easily and quickly ascertain which vehicle has the right of way. To obviate this difficulty a U-shaped member 4 is provided which member has its flanges 5 extending downwardly and longitudinally in relation to the automobile and headlight, therefore it will be seen that its forward and rear sides are open in such a manner that the device will not interfere with the forwardly projected rays of the headlight. The flanges 5 are provided with openings 6, in which openings a red transparent member 7 is disposed and a green transparent member 8. It will be seen that the red transparent member is disposed to the left of the headlight, therefore an approaching operator from the left of the machine, on which the device is located will know that the other vehicle has the right of way, and consequently he will have to stop his machine. If the green light is shown the approaching vehicle will know that he has the right of way and that the other vehicle will stop. By providing the signalling device accidents are obviated and vehicle operators will know with a certainty who has the right of way.

Secured to the upper side of the U-shaped member 4 is a bar 9, which bar at its rear end is bent downwardly and rearwardly and then upon itself to form the arm 10, which arm engages the inside of the rim 3 of the lamp. After the bar has been bent to form the arm 10, it is bent upwardly to form the segmentally shaped portion 11 for clamping over the rim 3, and terminates in a rearwardly extending arm 12 which engages the upper side of the lamp. The rear end of the arm 12 is provided with a notch 13 for receiving a headed lug 14 for preventing circumferential movement of the device on the lamp. The arm 9 is preferably formed from a spring material whereby it can be sprung to position on the lamp rim 3, however a relatively slight springing action of the supporting device for the U-shaped member is necessary.

From the above it will be seen that a signalling device is provided for automobile headlights, which signalling device is supported on the headlights forwardly of the lens in a position where light rays will pass therethrough and where the device will not materially interfere with the forward projection of rays from the light.

The invention having been set forth what is claimed as new and useful is:—

The combination with an automobile headlight comprising a casing, a lens carried by said casing, a rim carried by said casing, of an inverted horizontally and longitudinally disposed U-shaped member forwardly of the lens and having its sides diverging downwardly and provided with openings, differently colored transparent members in said openings, a supporting bracket for the U-shaped member, said supporting bracket comprising an arm detachably connected to the upper side of the casing rearwardly of the rim, the forward end of said arm being bent upon itself to form a downwardly and rearwardly extending clamping arm for clamping over the rim, said rim clamping arm terminating in an upwardly and forwardly extending arm, said upwardly and forwardly extending arm being attached to the U-shaped member, said supporting bracket being formed from a single piece of material.

In testimony whereof I have signed my name to this specification in the presence of two subscribing witnesses.

DAVID A. RITCHIE.

Witnesses:
JOSEPH J. RITCHIE,
CLAUD H. ROTH.